US010865488B2

(12) United States Patent
Fray et al.

(10) Patent No.: US 10,865,488 B2
(45) Date of Patent: Dec. 15, 2020

(54) METHOD OF PRODUCING GRAPHENE (71) Applicant: Cambridge Enterprise Limited, Cambridge (GB)

(72) Inventors: Derek Fray, Cambridge (GB); Ali Kamali, Cambridge (GB)

(73) Assignee: Cambridge Enterprise Limited, Cambridge (GB)

(*) Notice: Subject to any disclaimer, the term of this patent is extended or adjusted under 35 U.S.C. 154(b) by 7 days.

(21) Appl. No.: 16/665,220

(22) Filed: Oct. 28, 2019

(65) Prior Publication Data

US 2020/0095694 A1 Mar. 26, 2020

Related U.S. Application Data (62) Division of application No. 15/118,968, filed as application No. PCT/GB2015/050194 on Jan. 28, 2015, now Pat. No. 10,458,026.

(30) Foreign Application Priority Data

Feb. 14, 2014 (GB) .................................. 1402650.4

(51) Int. Cl.
C25B 9/00 (2006.01)
C25B 1/00 (2006.01)
(Continued)

(52) U.S. Cl.
CPC .............. *C25B 9/00* (2013.01); *C01B 32/184* (2017.08); *C01B 32/19* (2017.08); *C25B 1/00* (2013.01);
(Continued)

(58) Field of Classification Search
CPC ..... B82Y 30/00; B82Y 40/00; C01B 2204/32; C01B 32/184; C01B 32/19; C25B 1/00;
(Continued)

(56) References Cited

U.S. PATENT DOCUMENTS 6,767,447 B2 7/2004 Uno et al.
2010/0055025 A1 3/2010 Jang et al.
(Continued)

FOREIGN PATENT DOCUMENTS

CN 102465309 A 5/2012
CN 103132100 A 6/2013
(Continued)

OTHER PUBLICATIONS

Huang et al. "Highly efficient electrolytic exfoliation of graphite into graphene sheets based on Li ions intercalation-expansion-microexplosion mechanism" J. Mater. Chem., 2012, 22, 10452-10456 (Year: 2012).*

(Continued)

*Primary Examiner* — Anthony J Zimmer
*Assistant Examiner* — Syed T Iqbal
(74) *Attorney, Agent, or Firm* — Todd Allen Serbin; Nexsen Pruet, LLC (57) ABSTRACT

A method of producing graphene sheets comprising the steps of, (a) forming a carbonaceous powder by electrochemical erosion of a graphite electrode in a molten salt comprising hydrogen ions, (b) recovering the resulting carbonaceous powder from the molten salt liquid, and (c) thermally treating the carbonaceous powder by heating the carbonaceous powder in a non-oxidising atmosphere to produce a thermally treated powder comprising graphene sheets.

19 Claims, 6 Drawing Sheets (51) Int. Cl.
   *C25B 11/14* (2006.01)
   *C01B 32/184* (2017.01)
   *C01B 32/19* (2017.01)
   *B82Y 30/00* (2011.01)
   *B82Y 40/00* (2011.01)

(52) U.S. Cl.
   CPC ............... *C25B 11/14* (2013.01); *B82Y 30/00* (2013.01); *B82Y 40/00* (2013.01); *C01B 2204/32* (2013.01); *Y10S 977/734* (2013.01); *Y10S 977/845* (2013.01)

(58) Field of Classification Search
   CPC ....... C25B 9/00; C25B 11/14; Y10S 977/734; Y10S 977/845
   See application file for complete search history.

(56) References Cited

U.S. PATENT DOCUMENTS

| | | |
|---|---|---|
| 2010/0323177 A1 | 12/2010 | Ruoff |
| 2013/0161199 A1 | 1/2013 | Li et al. |
| 2013/0119321 A1* | 5/2013 | Lettow ..................... H01B 1/08 252/510 |
| 2013/0164208 A1 | 6/2013 | Hsieh et al. |
| 2015/0027900 A1* | 1/2015 | Dryfe ........................ C25B 1/00 205/555 |

FOREIGN PATENT DOCUMENTS

| | | |
|---|---|---|
| CN | 104321275 A | 1/2015 |
| GB | 2488825 A | 9/2012 |
| GB | 2523154 B | 9/2012 |
| JP | 2014001126 A | 1/2014 |
| WO | 2011019095 | 2/2001 |
| WO | 2011014347 A1 | 3/2001 |
| WO | 2011083895 A1 | 7/2011 |
| WO | 2011083896 A1 | 7/2011 |
| WO | 2012035551 A1 | 3/2012 |
| WO | 2012154677 A1 | 11/2012 |
| WO | 2013132261 | 9/2013 |
| WO | 2013154997 | 10/2013 |
| WO | 2015019093 | 2/2015 |

OTHER PUBLICATIONS

Prothero, Gareth; GB Search Report; GB1402650.4; 4 pages; dated Oct. 13, 2014 Oct. 13, 2014.

Rigondaud, Bernard; PCT/GB2015/050194; International Search Report and Written Opinion; ISA/EPO; 18 pages dated Apr. 9, 2015.

Nickitas-Etienne, Athina; PCT/GB2015/050194; International Preliminary Report on Patentability; IB; 7 pages; dated Aug. 25, 2016 Aug. 25, 2016.

Peplow, Mark, "The Quest for Supercarbon", Nature, pp. 327-327, vol. 503, Nov. 21, 2013 Nov. 21, 2013.

Kamali et al.; "Molten Salt Corrosion of Graphite as a Possible Way to Make Carbon Nanostructures", Carbon 56, pp. 121-131; 2013 2013.

Lehmann et al.; "Ionic Liquid Based Graphese Electrochemical Exfoliation", Frauhofer Institute for Manufacturing Engineering and Automotion IPA, 1 page, 2013. 2013.

Che et al.; "A New Approach to Fabricate Graphene Nanosheets in Organic Medium: Combination of Reduction and Dispersion", Journal of Materials Chemistry, vol. 20, pp. 1722-1727, Nov. 2, 2009. Nov. 2, 2009.

Che et al.; "Supporting Information A New Approach to Fabricate Graphene Nanosheets in Organic Medium: Combination of Reduction and Dispersion", Journal of Materials Chemistry, 3 pages, 2010. 2010.

Jiong, Lu et al., "One-Pot Synthesis of Fluorescent Carbon Nanoribbons, Nanoparticles, and Graphene by the Exfoliation of Graphite in Ionic Liquids", American Chemical Society, vol. 3, No. 8, pp. 2367-2375, 2009. 2009.

Liu et al.; "One-Step Ionic-Liquid-Assisted Electrochemical Synthesis of Ionic-Liquid-Functionalized Graphene Sheets Directly from Graphite", Advanced Functional Materials, vol. 18, pp. 1518-1525, 2008. 2008.

Wei T Al.; "Graphene from Electrochemical Exfoliation and its Direct Applications in Enhanced Energy Storage Devices", vol. 48, pp. 1239-1241. 2012. 2012.

Kamali et al., "Correlation Between Microstructure and Thermokinetic Characteristics of Electrolytic Carbon Nanomaterials", Corrosion Science 64, pp. 90-97, 2012. 2012.

Schwandt et al.; "The Preparation of Nano-structured Carbon Materials by Electrolysis of Molten Lithium Chloride at Graphite Electrods", Journal of Electroanalytical Chemistry 647, pp. 150-158, 2010. 2010.

Kamali et al.; "On the Oxidation of Electrolytic Carbon Nanomaterials", Corrosion Science 54, pp. 307-313, 2012. 2012.

Kamali et al,: "Effect of the Graphite Electrode Material on the Characteristics of Molten Salt Electrolytically Produced Carbon Nanomaterials", Materials Characterization 62, pp. 987-994, 2011. 2011.

Huang et al.; "Highly Efficient Electrolytic Exfoliation of Graphite into Graphene Sheets Based on Li ions Intercalation-Expansion-Microexplosion Mechanism", Journal of Materials Chemistry, vol. 22, pp. 10452-10456, 2012. 2012.

Kamali et al.; "Thermokinetic Characteristics of Lithium Chloride", J. Therm. Anal. Calorim., vol. 104, pp. 619-626, 2011. 2011.

Chinese Office Action and Search Report; CN201580016756.8; 8 pages; dated Jan. 10, 2018. Jan. 10, 2018.

Ono, Hisako; Notice of Reasons for Rejection; JP 2016-551192; Japanese Patent Office; 8 pages; dated Jan. 22, 2019. Jan. 22, 2019.

\* cited by examiner

METHOD OF PRODUCING GRAPHENE

RELATED APPLICATION

This application is a continuation of, and claims the benefit of priority under 35 U.S.C. § 120 of, U.S. patent application Ser. No. 15/118,968 filed on Aug. 15, 2016, the contents of which are incorporated herein by reference in their entirety.

FIELD OF INVENTION

The invention relates to methods of producing graphene sheets, for example graphene nanosheets, by processes that involves the electrochemical exfoliation of a graphite electrode, preferably followed by heating in a non-oxidising or reducing environment

BACKGROUND

The term "carbon nanostructures" includes structures such as fullerenes, carbon nanotubes (CNTs), carbon nanofibres, carbon nanoparticles, carbon nanoplates, and graphene. Graphene, in particular, possesses many extraordinary properties such as high ballistic electron mobility, high thermal conductivity, high Young's modulus, high fracture strength, and a high specific surface area. Recently, graphene-based nanomaterials that are, in the literature, variously called graphene, carbon nanoflakes, carbon nanoflowers, carbon nanohorns, carbon nanowalls, or graphene nanosheets (GNSs), have attracted scientific attention due to their unique dimensions, structure, and electronic properties, which make them promising candidates for many applications. Such structures shall be referred to in this document as graphene sheets or graphene nanosheets. Possible applications for graphene nanosheets include use in electron field emitters, electrochemical capacitors, electrode material for capacitive deionisation, anode materials for lithium-ion batteries, catalyst supports, biosensors, electrodes for fuel cells, photocatalytic applications, transparent conducting films and nanocontactors. Other potential applications may include or involve corrosion prevention, conducting inks, lubricants, more efficient solar cells, novel antibiotics, and filler in new ultra high performance polymer-, ceramic- and metal-based composites. In addition to these, graphene/semiconductor nanocomposites are promising new class of catalysts for the photodegradation of dye pollutants. Graphene also provides new opportunities to advance water desalination technologies, and challenges the current existing adsorbents employed for the removal of low concentrated contaminants from aqueous solutions. Also, graphene nanosheets can be used as templates for fabrication of other nanostructured materials.

Graphene sheets were produced for the first time in small amounts by an "up to bottom" approach of micromechanical cleavage of highly oriented pyrolytic graphite (HOPG). Later, relatively larger amounts of chemically modified graphene sheets were produced by a number of approaches, all of which made use of HOPG as the starting material and involved labour-intensive preparations. More recently there has been a focus on the preparation of graphene sheets using similar methods to those employed in the production of carbon nanotubes. For example, graphene sheets have been synthesized by chemical vapour deposition (CVD) techniques on a substrate as vertically aligned carbon sheets having an average thickness of several nanometres. Graphene sheets have also been synthesized by plasma enhanced CVD (PECVD), hot-wire CVD, dc-plasma enhanced CVD (dc-PECVD), radiofrequency (rf)-PECVD, inductively coupled PECVD, inductively coupled rf-PECVD, glow discharge PECVD, microwave discharge CVD, electron beam excited PECVD, and also by pyrolysis-based methods.

CVD-based synthesis methods for graphene sheets suffer from low production rates, which can be as low as 32 nm min$^{-1}$. If a surface area of 1 m$^2$ is used for the CVD process, the rate of graphene production is typically less than 1 g per day. Moreover, these methods require complex equipment. As an alternative to CVD processes, the exfoliation of graphite into carbon nanomaterials by room temperature ionic liquids has been subject of a number of studies. It has been shown that the electrolysis of room temperature ionic liquids with graphite electrodes may lead to some erosion or exfoliation of the graphite electrode material into carbon nanostructures including graphene sheets. However, the rate of the synthesis of graphene in room temperature ionic liquids is low. Moreover, room temperature ionic liquids are mostly toxic, non-biodegradable and too expensive.

At present, no graphene sheet production process exists that is capable of supplying large amounts of graphene sheets or graphene-based materials. Thus, the development of applications and materials using graphene is difficult.

DETAILED DESCRIPTION OF THE INVENTION

The invention provides methods of producing graphene sheets and a carbonaceous powder comprising graphene sheets as defined in the appended independent claims to which reference should now be made. Preferred and/or advantageous features of the invention are set out in dependent sub-claims.

Thus, in a first aspect a method of producing graphene sheets may comprise the steps of, (a) forming a carbonaceous powder by electrochemical erosion of a graphite electrode in a molten salt, the molten salt comprising hydrogen ions, (b) recovering the resulting carbonaceous powder from the molten salt, and (c) thermally treating the carbonaceous powder by heating the carbonaceous powder in a non-oxidising or reducing atmosphere to produce a thermally treated powder comprising graphene sheets.

The terms graphene sheets or graphene refer to a two-dimensional crystalline allotrope of carbon. Graphene may be considered to be a one atomic layer thick sheet of graphite. As used herein, the terms graphene sheets or graphene also include sheets having a thickness of up to ten atomic layers. Depending on the lateral dimensions of the sheet, the graphene may be referred to as a graphene sheet or a graphene nanosheet. Graphene nanosheets typically have lateral dimensions, i.e. dimensions in x and y directions, of between 50 nanometres and 500 nanometres. Graphene sheets may have lateral dimensions of greater than 500 nanometres.

The molten salt contains hydrogen either as free hydrogen ions, or as a dissolved species which may then ionize to form hydrogen ions. For example, the molten salt may comprise dissolved water, lithium hydroxide, and/or hydrogen chloride, and these dissolved species may be a source of hydrogen ions. Hydrogen may be present in low concentrations. For example, the molten salt may contain as little as about 400 ppm of hydrogen ions.

As used herein, the term carbonaceous powder refers to a powder comprising carbon nanostructures produced by electrochemical erosion of a graphite electrode. Such carbon nanostructures typically have maximum dimensions of less than 1000 nanometres, for example less than 500 nanometres.

A particularly preferred molten salt comprises lithium chloride, as such a salt is capable of dissolving water. Lithium chloride has a melting point of about 605° C. Other halide salts of lithium may also be particularly advantageous. A suitable molten salt may comprise other cation species, however, such as sodium or potassium. For example, a lithium chloride-potassium chloride mixture of eutectic composition may be a suitable molten salt. Such a eutectic has a low melting point of about 350° C., which may advantageously allow electrochemical erosion of a graphite electrode at relatively low temperatures. The molten salt comprises hydrogen ions. For example, hydrogen may be present in the molten salt as water, hydrogen chloride or hydrogen ions. The hydrogen containing species, such as water or hydrogen chloride, may ionize in the molten salt to generate hydrogen ions within the salt.

The electrochemical erosion of a graphite electrode involves the positioning a graphite electrode, along with a second electrode in a molten salt. The second electrode may also be a graphite electrode. An electric potential is applied between the electrodes and a current flows. The current may be direct current or alternating current. When the graphite electrode is cathodic with respect to the other electrode, positive ions from the ionic liquid migrate to the graphite electrode where the ions discharge. If the current is direct current the graphite electrode will be a cathode and the second electrode will be an anode. In case of an alternating current, the graphite electrodes would alternate between being cathodes and anodes.

It is believed that during electrolysis cations from the molten salt, such as lithium ions and hydrogen ions, are discharged and the atoms or molecules thus formed are intercalated between layers of the graphite material forming the graphite electrode. Intercalated atoms or molecules may combine to form compounds, for example, lithium hydride. It is believed that this intercalation of species derived from the molten salt causes the erosion or exfoliation of carbonaceous particles from the graphite electrode. These particles may be in the form of sheets, discs, flakes or tubes of graphite. The exfoliated material may be a single graphite layer thick or, more frequently, may be in the form of a stack that is multiple graphite layers thick.

It may be preferred that the temperature of the molten salt during electrochemical erosion of the electrode is relatively high, in order to increase production rates of the carbonaceous powder. For example, it may be advantageous that the temperature is greater than 800° C., for example about 1000° C.+/−100° C., during electrochemical erosion of the graphite electrode. It may be particularly preferred that the step of electrochemical erosion of the graphite electrode takes place in a lithium chloride based molten salt containing hydrogen ions, and at a temperature of greater than 800° C. Carbonaceous powder produced by electrochemical erosion of a graphite electrode at such high temperatures may advantageously contain a higher proportion of sheets, plates, flakes, and carbon nanoscrolls in which the walls of nanoscrolls are partially unscrolled into graphene nanosheets, and a lower proportion of carbon tubes, than a powder produced by electrochemical erosion at lower temperatures.

It may be preferred that the current density at the graphite electrode is 0.5 Amps per square centimetre ($A/cm^2$) or greater during the electrochemical erosion of the graphite electrode. The rate of production may be advantageously increased by performing the electrochemical erosion using a current density of 2 $A/cm^2$ plus or minus 0.5 $A/cm^2$. If stainless steel rods of 0.6 cm in diameter and 70 cm in length are used to connect the electrodes to the potential leads, an average voltage of 6.7 V is required to maintain a constant current of 35 A between the electrodes, corresponding to a cathode current density of about 1.1 $A/cm^2$. In this condition, the average potential difference between the graphite cathode and a Mo reference electrode immersed in the molten salt is about −3.0 V.

The graphite electrode may be formed of any suitable graphite material. Graphite materials having larger grain sizes (for example grain sizes of greater than 10 microns) and larger crystallite sizes (for example crystallite sizes of greater than 30 nanometres) may advantageously form a carbonaceous powder having particles with larger planar sizes. Such carbonaceous powder may form graphene sheets of large lateral dimensions (e.g. greater than 500 nm lateral dimensions) after thermal treatment in a non-oxidising atmosphere.

Although specialist grades of graphite may be used, a preferred electrode may be formed from an industrial grade graphite. Industrial grade graphite electrodes are readily available at large scales with reasonably low costs. Such electrodes are primarily used as the electrodes of electric arc and ladle furnaces in the steel industry, and therefore readily available in different sizes up to about 3 m long and 0.7 m in diameter. Industrial grade graphite electrodes are made by mixing petroleum coke with coal tar binder, followed by extrusion and baking to carbonize the binder. The electrodes are finally graphitized by heating at high temperatures, at which point the carbon atoms arrange into graphite. Owing to the raw materials used, and economical issues, industrial grade graphite electrodes can be considered as an ideal raw material for cheap and green graphene production technologies in the future. The molten salt, may be brought into contact with a moist gas during the electrochemical erosion of the graphite electrode. Water from the moist gas may then react with the molten salt, to introduce hydrogen ions into the molten salt. For example, the electrochemical erosion of the graphite electrode may be performed in an electrolysis cell under an atmosphere of moist gas, for example a moist inert gas such as moist argon or moist nitrogen. The molten salt may be sparged with a moist gas such as moist argon or moist nitrogen.

Contact between the moist gas and the molten salt may be continuous for the duration of the electrochemical erosion process. Contact between the moist gas and the molten salt may be intermittent during the electrochemical erosion process, for example a flow of moist gas into the atmosphere above the molten salt may be switched and off at intervals. Contact between the moist gas and the molten salt may occur for a predetermined period prior to the electrochemical erosion of the graphite electrode in order to transfer hydrogen species to the molten salt.

A preferred method of producing a moist gas is to flow a gas stream over, or through, a water source prior to bringing the moist gas into contact with the molten salt. The skilled person will be aware of suitable methods of generating moist gases.

In preferred embodiments a method of producing graphene sheets comprises the steps of, (a) forming a carbonaceous powder by electrochemical erosion of a graphite electrode in a molten salt, the molten salt being in contact with a moist gas before and/or during electrochemical erosion of the electrode, (b) recovering the resulting carbonaceous powder from the molten salt, and (c) thermally treating the recovered carbonaceous powder by heating in a non-oxidising or reducing atmosphere to produce a thermally treated powder comprising graphene sheets. The moist gas is preferably a moist inert gas such as moist argon or moist nitrogen. The moist gas reacts with the molten salt to introduce hydrogen ions into the molten salt. The moist gas is preferably brought into contact with the molten salt by flowing a stream of the moist gas over the surface of the molten salt before or during electrochemical erosion of the graphite electrode, or by sparging the molten salt with the moist gas before or during electrochemical erosion of the graphite electrode. Water from the moist gas may become dissolved in the molten salt and then ionise to create hydrogen ions. Water from the moist gas may react with a component of the molten salt to form a hydrogen containing species, for example HCl, which then ionises to form hydrogen ions.

The molten salt may be in contact with a dry gas during the electrochemical erosion of the graphite electrode. That is, the atmosphere above the molten salt may not be a moist gas but may be a dry gas comprising a mixture of an inert gas, such as argon or nitrogen, and hydrogen. Preferably, hydrogen may be present at a concentration of between 1 and 10 mole percent, for example about 3 or 4 or 5 mole percent. The hydrogen may react with the salt to introduce hydrogen ions into the molten salt.

In preferred methods, the graphite electrode is operated such that it becomes cathodic in polarity during electrochemical erosion. The graphite electrode may, for example, become cathodic in polarity in connection with a counter electrode or anode. The counter electrode is also arranged in contact with the molten salt and may also be a graphite electrode. Anodic oxidation of graphite (such as may occur were the graphite electrode to be made anodic during exfoliation) may lead to the formation of a significant amount of oxygen-containing groups due to the overoxidation of the graphite. Exfoliation of graphite electrodes under cathodic conditions may provide the advantage of an absence of oxidizing conditions thereby preventing the generation of oxidation defects in the graphene product.

More than one graphite electrode may be arranged in contact with the molten salt and each of the more than one graphite electrode may be exfoliated. The use of two or more electrodes may advantageously allow the production of graphene on a large scale by using a number of relatively small sized electrodes. This may be beneficial as a number of smaller electrodes may not require high electric currents to produce graphene, with resultant technical and safety advantages. It may be beneficial, for example, to operate the exfoliation process using an electrode current density of, say, 2 A/cm$^2$. To effect a higher exfoliation rate it may be possible to use a larger graphite electrode. However, to maintain current density within desired levels it would be necessary to increase the overall current that is applied. The exfoliation of multiple smaller electrodes may allow higher production rates without the need to use higher electric currents.

As an example, the method may comprise the step of (a) forming a carbonaceous powder by electrochemical erosion of two or more graphite electrodes in a molten salt comprising hydrogen ions, each of the two or more graphite electrodes serves as a cathode in connection with a counter electrode for periods of time in order to effect the electrochemical erosion. Preferably, the method is operated such that each graphite electrode is alternately applied as the cathode in connection with a counter electrode. For example, if the method involves two graphite electrodes, a first graphite electrode and a second graphite electrode, the first electrode may be employed as a cathode in connection with a counter electrode (an anode) for a period of time. The second electrode may then be employed as a cathode in connection with the counter electrode for a period of time. The steps may then be repeated such that the first electrode again becomes a cathode in connection with the counter electrode. The alternation of the first and second electrode may continue for as long as required to achieve exfoliation.

Carbonaceous powder may be recovered from a molten salt by a process involving the steps of cooling and solidifying the molten salt containing the carbonaceous powder formed by erosion of the graphite electrode, and washing the solidified salt from the carbonaceous powder, for example washing using copious amounts of water. The method may further comprise the step of vacuum filtration of the washed carbonaceous material.

The carbonaceous powder recovered from the molten salt may comprise metal hydride residues. For example, if the carbonaceous powder is formed by electrochemical erosion of a graphite electrode in a lithium chloride containing molten salt, the molten salt containing lithium and hydrogen ions, the recovered carbonaceous powder may contain lithium hydride. Metal carbonate residue, for example lithium carbonate residue, may also form by side reactions. Preferably, any metal hydride or metal carbonate residues may be removed from the carbonaceous powder by the thermal treatment step.

In preferred embodiments the step of thermally treating the carbonaceous powder comprises heating of the carbonaceous powder to a temperature of greater than 1000° C. in a reducing atmosphere. For example, the carbonaceous powder may be thermally treated by heating to a temperature of greater than 1100° C. or 1200° C. in a reducing atmosphere. A microwave could also be used.

Preferably the carbonaceous powder is thermally treated by heating to the temperature of about 1250° C., plus or minus 50° C., in a reducing atmosphere.

The reducing atmosphere may be an atmosphere comprising a reducing gas, for example, an atmosphere comprising a mixture of nitrogen and hydrogen.

In alternative embodiments the carbonaceous powder may be thermally treated by heating in a low pressure environment. For example, the carbonaceous powder may be thermally treated by heating when under vacuum. Alternatively, the carbonaceous powder may be thermally treated by heating in an atmosphere of lower than atmospheric pressure comprising a reducing gas, for example a mixture of nitrogen and hydrogen.

Preferably the graphene sheets are graphene nanosheets having lateral dimensions of greater than 200 nanometres. For example, the graphene sheets may be graphene nanosheets having lateral dimensions of between 200 nanometres and 1000 nanometres.

In a second aspect, the invention may provide a carbonaceous powder comprising greater than 70% by weight of graphene sheets in which the graphene sheets have lateral dimensions greater than 200 nanometres. Preferably the carbonaceous powder comprises greater than 80% by weight of graphene sheets, for example greater than 85% by weight of graphene sheets or greater than 90% by weight of graphene sheets or greater than 95% by weight of graphene sheets.

Advantageously the rate of production of graphene sheets using a method defined herein may be orders of magnitude greater than current methods of producing graphene. For example, when operating the method using appropriate erosion temperatures and current densities, and a graphite electrode having a surface area of 1 m² in contact with the ionic liquid, graphene sheets may be produced at a rate of greater than 1.5 kg per hour. Thus, graphene sheets may be produced using the invention described herein at rates greater than 20 kg of graphene sheets, per square metre of graphite electrode in contact with the ionic liquid, per day (>20 kg/m² Day). Advantageously graphene sheets may be produced at rates greater than 25 kg/m² Day, or greater than 30 kg/m² Day, or greater than 40 kg/m² Day. Advantageously, the process may be operated such that graphene sheets are produced at a rate of greater than 100 kg/m² Day, or greater than 200 kg/m² Day.

In a further aspect, a method of producing graphene sheets may comprise the steps of, (a) forming a carbonaceous powder by electrochemical erosion of a graphite electrode in an ionic liquid, the ionic liquid comprising hydrogen ions, (b) recovering the resulting carbonaceous powder from the ionic liquid, and (c) thermally treating the carbonaceous powder by heating the carbonaceous powder in a non-oxidising or reducing atmosphere to produce a thermally treated powder comprising graphene sheets. The ionic liquid may be a molten salt or may be an organic or aqueous ionic liquid. Preferred or advantageous features of the method may be as set out above in relation to the first aspect.

In a further aspect, a method of producing graphene sheets may comprise the steps of, (a) forming a carbonaceous powder by electrochemical intercalation of a metallic species and a hydrogen species into a graphite electrode arranged in contact with an electrolyte, the electrolyte comprising the metallic ion species and the hydrogen ion species, (b) recovering the resulting carbonaceous powder from the electrolyte, and (c) thermally treating the carbonaceous powder by heating the carbonaceous powder in a non-oxidising or reducing atmosphere to produce a thermally treated powder comprising graphene sheets. The electrolyte may be a molten salt or may be an organic or aqueous ionic liquid. The metallic ion species is preferably lithium, but may be other metallic such as sodium or potassium ions. The electrolyte is preferably a lithium chloride based molten salt comprising hydrogen ions. Preferred or advantageous features of the method may be as set out above in relation to the first aspect.

In a further aspect, a method of producing graphene sheets may comprise the steps of, (a) forming a carbonaceous powder by electrochemical intercalation of hydrogen into a graphite electrode arranged in contact with an electrolyte, the electrolyte comprising hydrogen ions, (b) recovering the resulting carbonaceous powder from the electrolyte, and (c) thermally treating the carbonaceous powder by heating the carbonaceous powder in a non-oxidising or reducing atmosphere to produce a thermally treated powder comprising graphene sheets. The electrolyte may be a molten salt or may be an organic or aqueous ionic liquid. The electrolyte is preferably a molten salt, for example a lithium chloride based molten salt, comprising hydrogen ions. Preferred or advantageous features of the method may be as set out above in relation to the first aspect. In some circumstances the graphene sheets produced by electrochemical erosion of a graphite electrode may be of high enough purity that the step of thermal treatment may be omitted. Thus, in a further aspect, a method of producing graphene sheets may comprise the steps of, (a) forming a carbonaceous powder by electrochemical erosion of a graphite electrode in a molten salt, the molten salt comprising hydrogen ions, and (b) recovering the resulting carbonaceous powder comprising graphene sheets from the molten salt. It may be particularly preferred that the graphite electrode is used as a negative electrode (cathode) during the electrochemical erosion. It may be particularly preferred that the electrochemical erosion occurs under an atmosphere consisting of a mixture of inert gas- and hydrogen, particularly preferably a dry inert gas- and hydrogen mixture. It may be preferred that the molten salt is lithium chloride or lithium chloride based. Preferred or advantageous features of the method may be as set out above in relation to the first aspect.

In a further aspect, a method of producing graphene sheets may comprise the steps of, (a) forming a carbonaceous powder by electrochemical erosion of a graphite electrode in a molten salt, in which electrochemical erosion of the graphite electrode is performed under an atmosphere comprising an inert gas and hydrogen, and (b) recovering the resulting carbonaceous powder, which comprises graphene sheets, from the molten salt. Preferably the atmosphere does not contain water. The use of an atmosphere comprising hydrogen in contact with the molten salt may improve the production of graphene sheets such that a thermal treatment step is not required to produce a high yield of graphene. Graphene produced using a moist atmosphere according to embodiments disclosed above may contain impurities, such as lithium carbonate. The use of a dry gaseous atmosphere comprising hydrogen may allow formation of high purity graphene. The method may comprise the further step of (c) thermally treating the carbonaceous powder by heating the carbonaceous powder in a non-oxidising atmosphere to produce a thermally treated powder comprising graphene sheets. Preferably the atmosphere comprises an inert gas selected from the list consisting of argon and nitrogen, and hydrogen. Preferably the atmosphere comprises between 2 and 10 mole percent hydrogen, for example about 4 mole percent hydrogen. Preferred or advantageous features of the method may be as set out above in relation to the first aspect.

In a further aspect, a method of producing graphene sheets may comprise the steps of, (a) forming a carbonaceous powder by electrochemical erosion of two or more graphite electrodes in a molten salt comprising hydrogen ions, in which electrochemical erosion of the graphite electrodes is performed under an atmosphere comprising an inert gas and hydrogen, and (b) recovering the resulting carbonaceous powder, which comprises graphene sheets, from the molten salt. Preferably, the method is operated such that each graphite electrode is alternately used as a negative electrode in connection with a positive counter electrode. For example, if the method involves two graphite electrodes, a first graphite electrode and a second graphite electrode, the first electrode may be used as a negative electrode (a cathode) in connection with a positive counter electrode (an anode) for a period of time. The second electrode may then be used as a cathode in connection with the counter electrode for a period of time. The steps may then be repeated such that the first electrode is used as a cathode in connection with the counter electrode. The alternation of the first and second electrode may continue for as long as required to achieve exfoliation. Preferred or advantageous features of the method may be as set out above in relation to the first aspect.

Embodiments of the invention may be as defined by one or more of the following numbered clauses.

1. A method of producing graphene sheets comprising the steps of, (a) forming a carbonaceous powder by electrochemical erosion of a graphite electrode in a molten salt comprising hydrogen ions, (b) recovering the resulting carbonaceous powder from the molten salt liquid, and (c) thermally treating the carbonaceous powder by heating the carbonaceous powder in a non-oxidising atmosphere to produce a thermally treated powder comprising graphene sheets.

2. A method according to clause 1 in which the molten salt comprises a halide salt of lithium, sodium or potassium.

3. A method according to clause 1 in which the temperature of the molten salt during the electrochemical erosion of the graphite electrode is greater than 800° C.

4. A method according to clause 1 in which the molten salt and the carbonaceous powder is recovered from the molten salt by a process comprising steps of cooling and solidifying the molten salt, and washing the solidified salt from the carbonaceous powder.

5. A method according to clause 4 further comprising the step of vacuum filtration of the washed carbonaceous material.

6. A method according to clause 1 in which the carbonaceous powder comprises a metal hydride compound prior to the step of thermal treatment, for example lithium hydride, the metal species in the metal hydride being derived from the molten salt.

7. A method according to clause 1 in which the carbonaceous powder is thermally treated by heating to a temperature of greater than 1,000° C., for example to 1250° C.+/−50° C., in a reducing atmosphere, for example, in a reducing gas atmosphere comprising a mixture of nitrogen and hydrogen.

8. A method according to clause 1 in which the carbonaceous powder is thermally treated by heating in a lower than atmospheric pressure environment.

9. A method according to clause 1 in which the graphene sheets are graphene nanosheets having lateral dimensions of greater than 200 nanometres.

10. A method according to clause 1 in which the current at the graphite electrode during electrochemical erosion of the electrode is greater than 0.5 A/cm$^2$.

11. A method according to clause 1 in which graphene sheets are produced at a rate of greater than 1 kg per hour, per square metre of graphite electrode immersed in the ionic liquid.

12. A method according to clause 1 in which the graphite electrode is cathodic in polarity during electrochemical erosion.

13. A method according to clause 1 comprising the step of: (a) forming a carbonaceous powder by electrochemical erosion of two or more graphite electrodes in a molten salt comprising hydrogen ions, each of the two or more graphite electrodes alternately serving as a negative electrode in connection with a positive counter electrode for periods of time in order to effect the electrochemical erosion.

14. A method of producing graphene sheets comprising the steps of: (a) forming a carbonaceous powder by electrochemical erosion of a graphite electrode in an ionic liquid, the ionic liquid comprising hydrogen ions, (b) recovering the resulting carbonaceous powder from the ionic liquid, and (c) thermally treating the carbonaceous powder by heating the carbonaceous powder in a non-oxidising or reducing atmosphere to produce a thermally treated powder comprising graphene sheets.

15. A method of producing graphene sheets comprising the steps of: (a) forming a carbonaceous powder by electrochemical intercalation of a metallic species and a hydrogen species into a graphite electrode, the graphite electrode being arranged in contact with an electrolyte, the electrolyte comprising the metallic species and the hydrogen species, (b) recovering the resulting carbonaceous powder from the electrolyte, and (c) thermally treating the carbonaceous powder by heating the carbonaceous powder in a non-oxidising or reducing atmosphere to produce a thermally treated powder comprising graphene sheets.

16. A method of producing graphene sheets comprising the steps of: (a) forming a carbonaceous powder by electrochemical erosion of a graphite electrode in a molten salt, in which electrochemical erosion of the graphite electrode is performed under an atmosphere comprising an inert gas and hydrogen, and (b) recovering the resulting carbonaceous powder, which comprises graphene sheets, from the molten salt.

17. A method according to clause 16 further comprising the step of: (c) thermally treating the carbonaceous powder by heating the carbonaceous powder in a non-oxidising atmosphere to produce a thermally treated powder comprising graphene sheets.

18. A method according to clause 16 in which the atmosphere comprises an inert gas selected from the group consisting of argon and nitrogen, and hydrogen, having between 2 and 10 mole percent hydrogen in a dry atmosphere.

Specific embodiments of the invention according to one or more aspect disclosed above will now be described with reference to the figures, in which;

FIGS. 2A and 2B are scanning electron microscopy (SEM) micrographs of the carbonaceous powder formed by electrochemical erosion of a graphite electrode, showing a structure of predominantly carbon flakes and carbon plates, FIG. 2A is at low magnification and shows clumps of graphene sheets, FIG. 2B is at much higher magnification shows the clumps are made up of segments of graphene sheets;

FIGS. 3A, 3B and 3C are transmission electron microscopy (TEM) micrographs showing graphene sheets produced as a result of thermally treating a carbonaceous powder formed by electrochemical erosion of a graphite electrode.

A method of forming graphene sheets according to one or more aspect disclosed above comprises two main steps. In the first of these steps a carbonaceous powder is formed by the electrochemical erosion of a graphite cathode. In the second of these steps the carbonaceous powder is heated in a non-oxidising atmosphere.

Figure 1A:
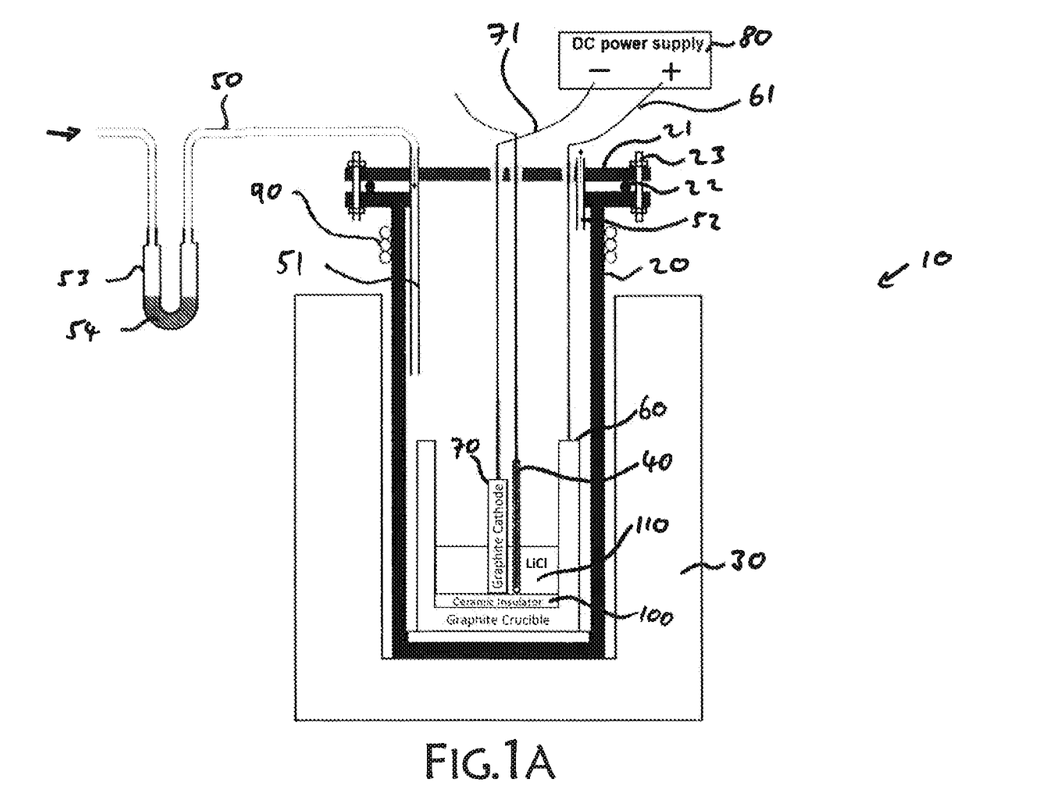
FIG. 1A is a schematic illustration of an apparatus for electrochemical erosion of a graphite electrode to produce a carbonaceous powder.

A schematic representation of an apparatus used for the electrochemical erosion process is shown in FIG. 1A. The apparatus 10 comprises a vertical tubular Inconel reactor 20, which is positioned inside a resistance furnace 30. The upper end of the reactor 20 is closed with a stainless steel lid 21 sealed with an O-ring 22 and compression fittings 23. The lid 21 is equipped with feedthroughs for electrode leads and a thermocouple 40 as well as with steel pipes for a gas inlet 51 and a gas outlet 52.

An anode 60 is formed from a graphite crucible having an internal diameter of 60 mm and height of 150 mm. A cathode 70 is formed from a graphite rod having a diameter of 15 mm, length of 100 mm, and a weight of 32 g. The anode 60 and the cathode 70 are electrically connected to a DC power supply 80 by electrode leads 61, 71. A water cooling system 90 prevents an upper portion of the reactor 20 from overheating.

A disc of ceramic insulation 100 within the graphite crucible separates the anode 60 from the cathode 70. The graphite crucible contains an electrolyte 110 of molten lithium chloride (LiCl) in contact with the graphite cathode 70 and the anode 60.

Figure 1B:
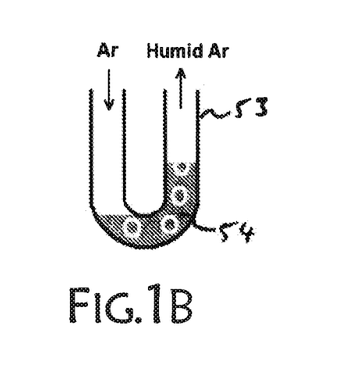
FIG. 1B is a close up of a portion of the apparatus of FIG. 1 illustrating how moist gas is produced.

The gas inlet 51 is coupled, via a steel pipe 50, to a gas canister containing dry argon. A U-bend 53, removably couplable to the steel pipe 50, contains water 54. When the U-bend is in position, dry argon bubbles through the water within the U-bend before entering the reactor 20 at the gas inlet 51. The U-bend is shown more clearly in FIG. 1b. On passing through the U-bend, the dry argon picks up water vapour and becomes moist argon. Thus, the atmosphere within the reactor 20 above the molten lithium chloride 110 is moist argon that enters through the gas inlet 51 and exits through the gas outlet 52.

In a specific example of an electrochemical erosion, 250 g of anhydrous LiCl was used as an electrolyte. The temperature of the electrolyte 110 was monitored by the thermocouple 40 placed inside the graphite crucible. Initially, the temperature of the electrolyte was raised to 770° C., at which temperature LiCl is in a molten state, by a ramp of 5° C. min$^{-1}$, under a dry argon flow of 20 cm$^3$ min$^{-1}$. After reaching this temperature, a U-bend 53, containing water 54, was placed in the path of the argon gas through the pipe 50 and the flow of the gas was increased to 100 cm$^3$ min$^{-1}$. Electrochemical erosion of the cathode was then effected by applying a constant direct current of 33.0 A between the cathode 70 and the anode 60 for a period of 50 minutes.

After the electrochemical erosion, the reactor 20 and its contents were cooled to room temperature, and the carbonaceous powder resulting from the erosion of the cathode was retrieved from the solidified salt by washing with copious amounts of distilled water and vacuum filtering. The carbonaceous powder obtained was dried at a temperature of 150° C. for 2 h.

To form the graphene sheets, 10 grams of the dried carbonaceous powder was heat treated in a horizontal tube furnace under an atmosphere containing 80% $N_2$-20% $H_2$. The temperature within the tube furnace was raised to 1250° C. at a heating rate of 15° C. min$^{-1}$ and this temperature was maintained for 30 min, before the furnace was cooled down to room temperature.

The resulting product was a black fluffy powder which was studied by different techniques and found to comprise at least 90% graphene nanosheets.

A JEOL 6340F field emission scanning electron microscope (SEM) and a 200 kV JEOL 2000FX analytical transmission electron microscope (TEM) equipped with electron diffraction were used for electron microscopy evaluations. A Philips 1710 X-ray diffractometer (XRD) with Cu—Ka radiation (k=1.54 A°) was used to record the diffraction patterns with a step size and dwell time of 0.05 2θ and 15 s, respectively. The diffraction patterns recorded were analyzed using the X'Pert High Score Plus program. Raman data were collected using a Renishaw 1000 Ramanscope with a He—Ne ion laser of wavelength 633 nm.

Figure 2A:
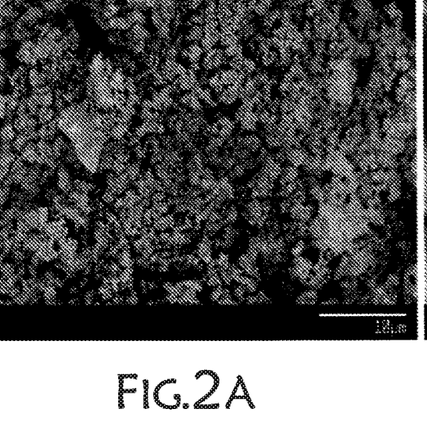
Figure 2B:
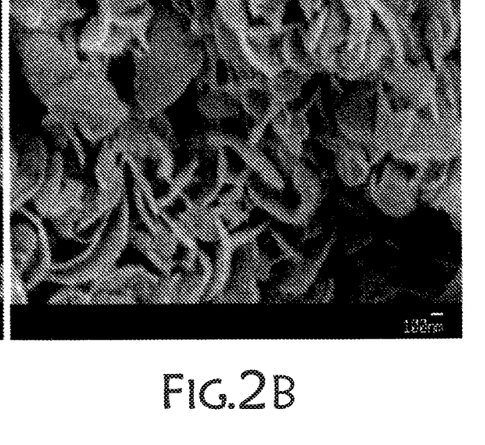

FIGS. 2A and 2B are SEM micrographs showing the carbonaceous powder produced by electrochemical erosion of a graphite cathode in a LiCl molten salt as detailed above.

FIG. 2B shows that powder comprises a multitude of carbon flakes or stacks having lateral dimensions of between 100 nm and 300 nm. These structures are several graphene layers in thickness. By contrast, when the experiment detailed above was operated under the same conditions but using a dry argon atmosphere rather than a moist argon atmosphere, the carbonaceous powder produced comprised a high proportion of carbon nanotubes and nanoparticles. It is believed that the presence of hydrogen ions in the electrolyte, derived from the moist argon in the atmosphere, may have caused a difference in the morphology of the carbonaceous powder produced.

Figure 3A:
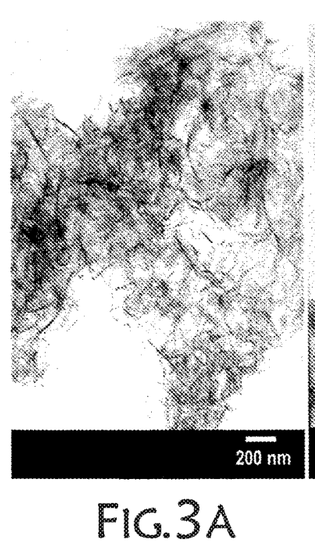
Figure 3B:
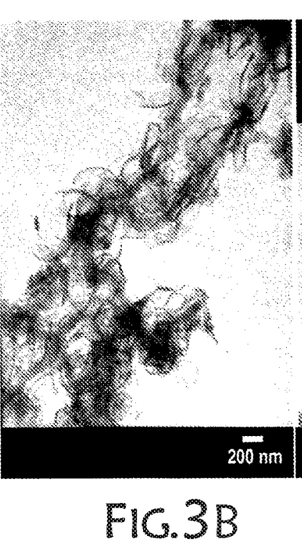
Figure 3C:
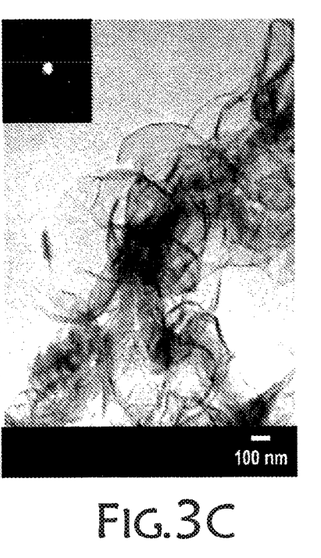
FIG. 3C shows an electron diffraction pattern of a single graphene sheet.

FIGS. 3A, 3B and 3C are TEM micrographs of the graphene nanosheets produced by thermally treating the carbonaceous powder resulting from electrochemical erosion of the graphite cathode under a moist argon atmosphere as described above. It can be seen that the carbon flakes and stacks of the carbonaceous powder (for example as illustrated in FIG. 2B) have disintegrated into individual sheets of graphene having a thickness of only a few atomic layers, many only a single atomic layer, and lateral dimensions of about 100 nm to 300 nm. FIG. 3C shows a selected area electron diffraction pattern derived from a graphene sheet.

Figure 4:
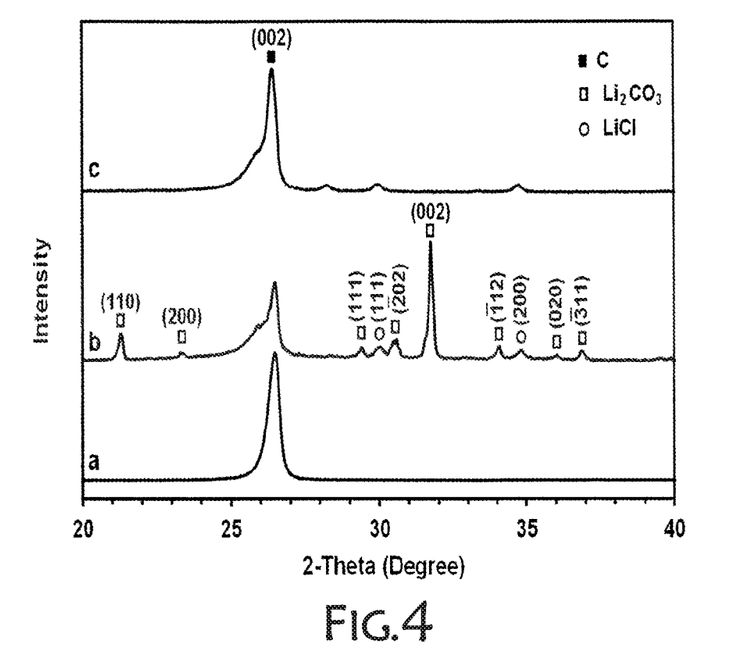
FIG. 4 illustrates x-ray diffraction patterns produced by (a) the graphite electrode, (b) carbonaceous powder produced as a result of electrochemical erosion of the graphite electrode, and (c) graphene sheets produced by thermally treating the carbonaceous powder.

FIG. 4 shows X-ray diffraction patterns of the material forming the graphite cathode (line (a)), the carbonaceous powder formed by electrochemically eroding the graphite cathode (line (b)), and the graphene sheets produced by thermal treatment of the carbonaceous powder (line (c)).

The prominent and sharp peak in the profile of the graphite cathode material at 2θ=26.441° corresponds to the (002) peak of graphite with an interlayer distance of 0.337 nm.

The X-ray diffraction pattern of the carbonaceous powder contains the (002) peak of graphite at 2θ=26.485° corresponding to an interlayer distance of 0.336 nm. This pattern also contains additional peaks that are due to $Li_2CO_3$ and LiCl phases. It is assumed that the $Li_2CO_3$ was formed by side reactions during the electrochemical process. It is also quite possible that a quantity of lithium chloride or lithium hydride is trapped in the microstructure of the carbon product during the electrolysis, which remains trapped after the washing step as it is inaccessible.

The X-ray diffraction pattern of the graphene sheets shows that the $Li_2CO_3$ diffraction peaks of the carbonaceous powder are absent, which indicates the removal of $Li_2CO_3$ during the heat treatment. Carbon has a sublimation point of about 3640° C., whereas $Li_2CO_3$ has an evaporation/decomposition point of about 1300° C. Thus, the $Li_2CO_3$ of the carbonaceous material has been removed by the thermal treatment in a reducing atmosphere. Similarly, LiH dissociates to lithium gas and hydrogen at around 1200° C. The (002) peak of the graphene sheets can be detected at 2θ=26.427 corresponding to an interlayer distance of 0.337 nm.

Figure 5:
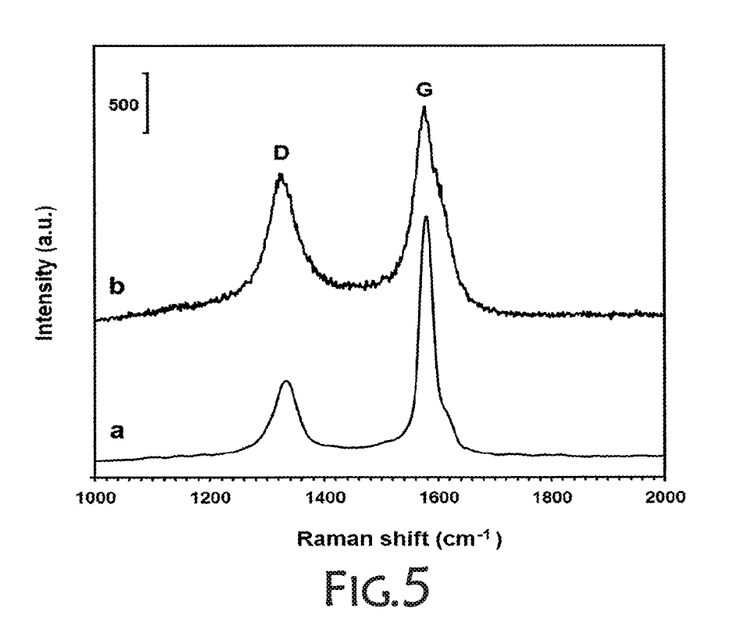
FIG. 5 illustrates Raman spectra in the range 1100-2000 cm$^{-1}$ produced by (a) the graphite electrode and (b) graphene sheets produced by thermally treating the carbonaceous powder produced as a result of electrochemical erosion of the graphite electrode.

FIG. 5 shows Raman spectra in the wave number range 1000-2000 cm$^{-1}$ of the material forming the graphite cathode (line (a)), and the graphene sheets produced by thermal treatment of the carbonaceous powder formed by electrochemically eroding the graphite cathode (line (b)).

Raman spectroscopy is a powerful technique to study the structural properties of carbon based materials. Both spectra shown in FIG. 5 are characterized by the presence of the so-called G band at 1576-1579 cm$^{-1}$ and D band at 1326-1332 cm$^{-1}$. The G-band is related to the vibration of sp$^2$ bonded carbon atoms in a two-dimensional hexagonal lattice, while the D-band is associated with structural defects and partially disordered carbon structures. The integrated intensity ratio IG/ID of the G and D bands is an index corresponding to the crystallinity of graphitic carbons.

The IG/ID ratios of the graphite cathode material and the graphene sheets are 3.3 and 1.5, respectively. The D peak may be induced to a certain degree by the edge of graphene sheets. The lower value for the IG/ID ratio in respect of the graphene sheets may, therefore, be attributed to the higher density of graphene edges in the graphene sheets material compared to the graphite cathode material. However, the ID/IG ratio for the graphene sheets is still high, and suggests that the graphene sheets are composed of small crystallites with a large degree of crystallinity.

Figure 6:
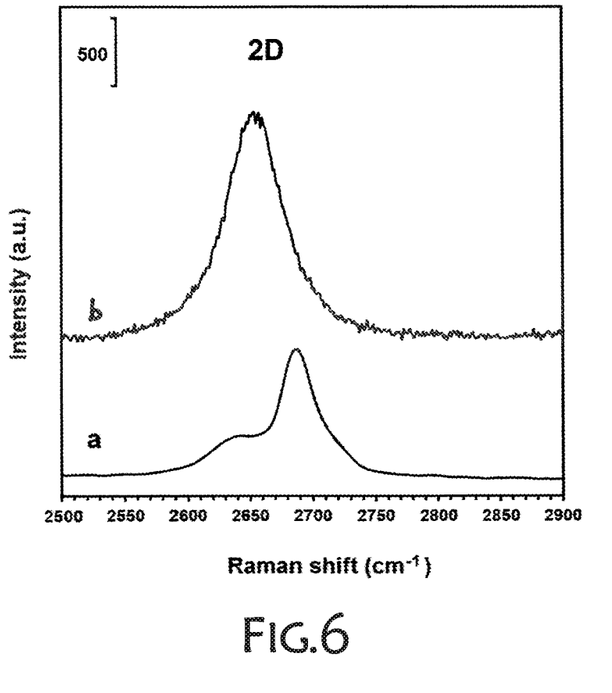
FIG. 6 illustrates Raman spectra in the range 2500-2900 cm$^{-1}$ produced by (a) the graphite electrode and (b) graphene sheets produced by thermally treating the carbonaceous powder produced as a result of electrochemical erosion of the graphite electrode.

FIG. 6 shows Raman spectra in the wave number range 2500-2900 cm$^{-1}$ of the material forming the graphite cathode (line (a)), and the graphene sheets produced by thermal treatment of the carbonaceous powder formed by electrochemically eroding the graphite cathode (line (b)). The 2D band observed in this wave number range is the overtone of the D band. As observed in FIG. 6, the 2D band of the graphite cathode has a shoulder, which disappears in the 2D band of the graphene sheets. Moreover, the 2D band of the graphene sheets is sharp and asymmetrical, suggesting that the graphene sheets consisted of mostly less than a few layers of graphene, i.e. mostly less than 5 layers of graphene.

The experiments described above show that a graphite rod can be eroded in molten LiCl under a cathodic potential, and that the erosion product can be mainly carbon nanotubes or carbon nanoflakes/stacks of graphene sheets, depending on whether the process is carried out in a dry or humid inert gas flow, respectively.

The molten salt formation of carbon nanotubes in dry inert gas has been the subject of a number of previous studies. The formation of carbon nanotubes is proposed to proceed through a three step mechanism involving a) the intercalation of alkali metal from a molten salt into interlayer spaces between graphite planes of a graphite electrode; b) a significant increase of mechanical stress at the surface of the graphite electrode caused by the intercalated species followed by the surface disintegration of the graphite layers into the molten salt, and c) rolling up the graphite layers into tubular structures.

The inventors have determined that the presence of water in the atmosphere above a molten salt changes the nature of the carbon nanostructures that are formed by erosion of a graphite electrode. While not wishing to be bound by theory, the mechanism may be as follows.

Molten LiCl may react with humidity of the moist argon atmosphere to form lithium oxides and hydrogen chloride. The formation of HCl also may lead to the formation of H$^+$ cations in the molten salt. The water from humidity of the moist argon atmosphere may also dissolve into molten LiCl, without reacting with LiCl. In this case, water can simply dissolve into LiCl and ionise into H$^+$ and O$^{-2}$. With this in mind, the formation of the graphene nanosheets by the molten salt erosion of a graphite cathode under a flow of humid Ar may be attributed to the intercalation of lithium and hydrogen into the interlayer spacing of graphite basal planes leading to the peeling of graphite to produce graphene nanosheets. Moreover, lithium compounds such as Li$_2$CO$_3$ may be formed by side reactions between carbonaceous materials, oxygen and lithium species in the molten salt. When heated at an elevated temperature, the lithium compounds are removed, thereby a high yield of graphene nanosheets is obtained. The heat treatment may also lead to the further splitting of stacks of graphene sheets, creating a higher proportion of individual graphene sheets (or stacks of graphene sheets having 10 or fewer atomic layers of thickness).

Figure 7:
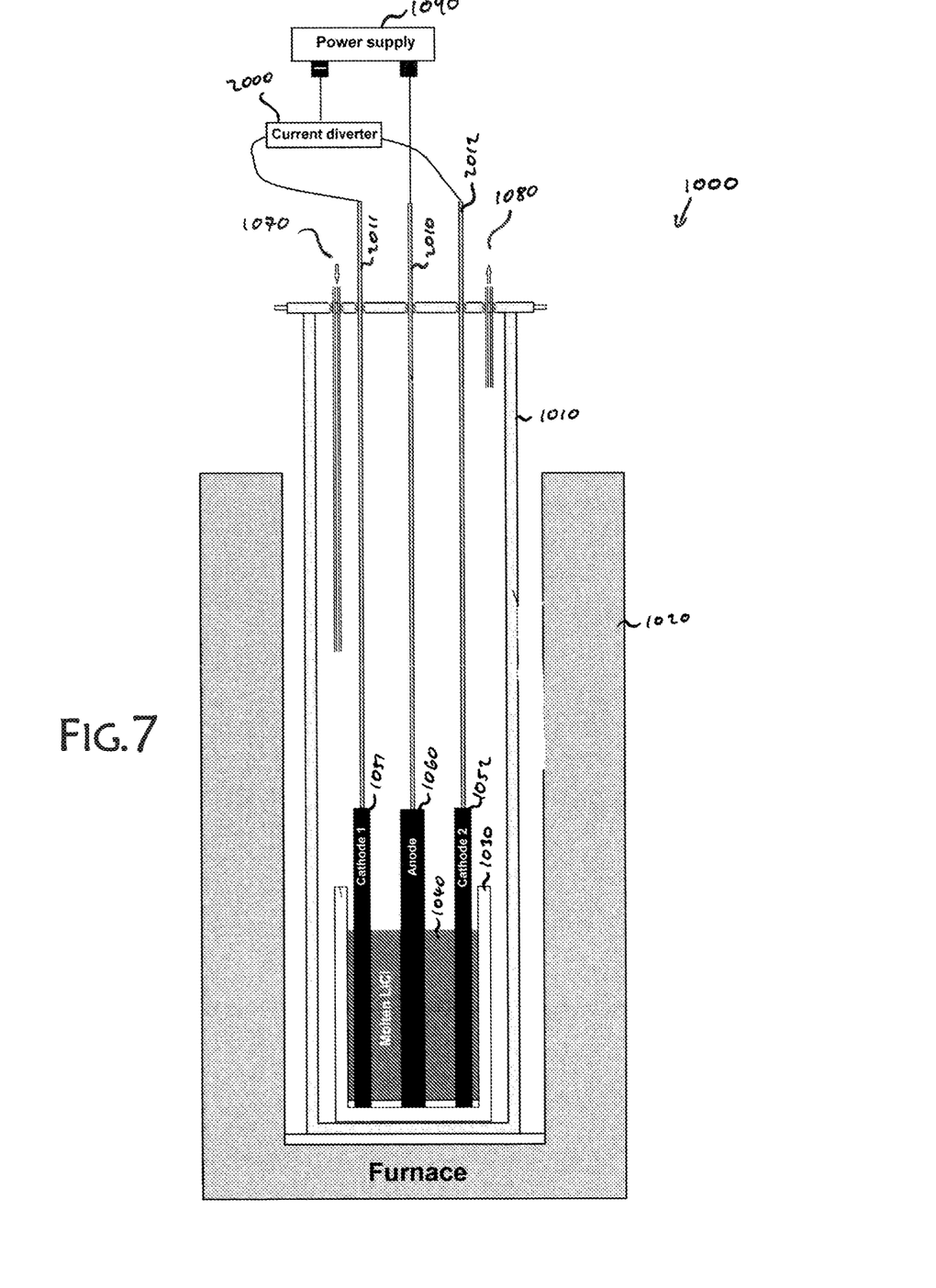
FIG. 7 is a schematic illustration of an apparatus for electrochemical erosion of graphite electrodes to produce a carbonaceous powder.

FIG. 7 illustrates an apparatus 1000 used for the production of graphene sheets using a method according to one or more aspects disclosed above. The apparatus comprises a vertical tubular Inconel reactor 1010 arranged within a resistance furnace 1020. An alumina crucible 1030 with an internal diameter of 10 cm and height of 16 cm is arranged within the reactor 1010.

1 kg of lithium chloride 1040 is arranged within the alumina crucible along with three graphite electrodes. The three graphite electrodes consist of a first cathode 1051, a second cathode 1052 and an anode 1060. All three electrodes are formed from a commercially available industrial grade graphite. The first cathode 1051 and the second cathode 1052 are rods having a diameter of 13 mm (Goodfellow 809-013-12, diameter 13 mm, length 15 cm, purity 99.997%). The anode 1060 is a rod having a diameter of 20 mm and length of 30 cm.

The anode 1060 is coupled to a power supply by means of a steel current connector 2010. The first and second cathodes are coupled to the power supply 1090 by way of steel current connectors 2011, 2012 and a DC current diverter 2000. The current diverter 2000 allows current from the power supply 1090 to be diverted to either the first cathode 1051 or the second cathode 1052.

An inlet 170 into the reactor allows for the flow of a shrouding gas into the reactor to form an atmosphere over the molten salt 1040. In the preferred example the shrouding gas consists of argon and 4 mole percent hydrogen. An outlet 1080 allows for outflow of the shrouding gas.

Figure 8:
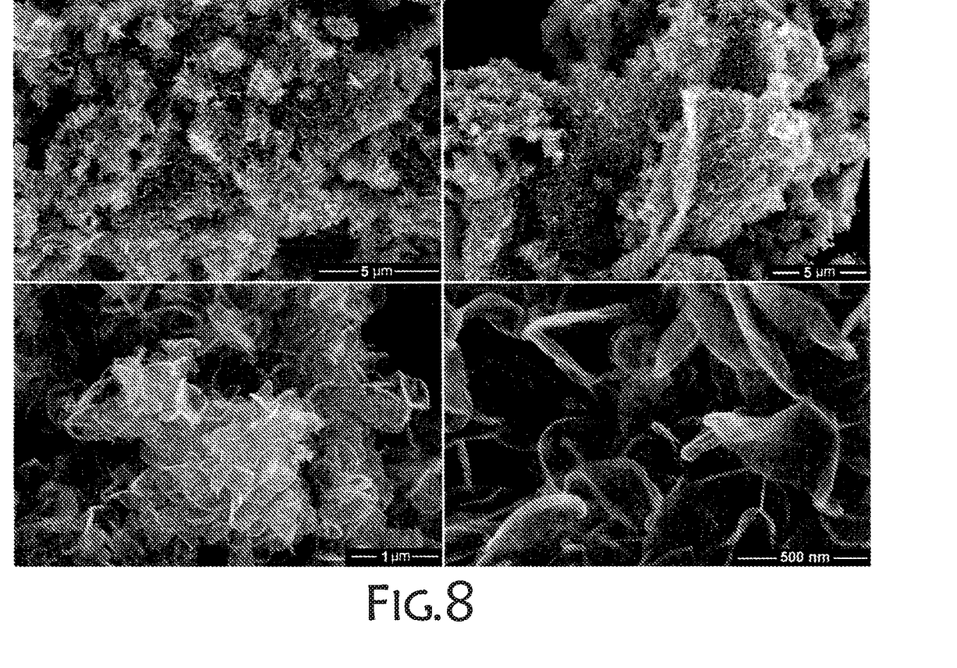
FIG. 8 shows SEM images of the graphene nanosheets produced by the cathodic exfoliation of the graphite electrodes in molten LiCl under an atmosphere of Ar—H$_2$, and FIG. 9 typical bright field TEM micrographs of graphene nanosheets produced in molten salt process under a flow of Ar—H$_2$.
Figure 9:
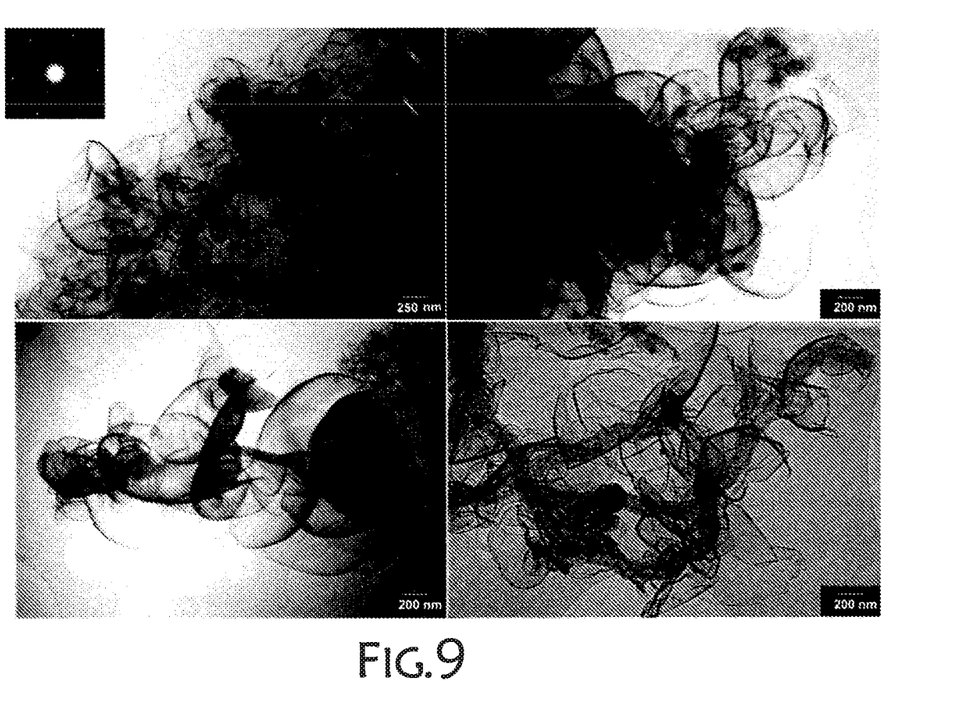

Initially, the temperature within the reactor was raised to about 800° C., where the LiCl is in a molten state, by a ramp of 5° C. min$^{-1}$, under a flow of 200 cm$^3$ min$^{-1}$ of gas mixture Ar-4% H$_2$. The gas mixture is a dry gas. Then the electrochemical process was carried out. The DC current diverter was adjusted so that the first cathode 1051 served as the working electrode, whilst the anode 1060 served as a counter electrode. In this condition a constant direct current of 40 A, corresponding to a cathode current density of about 0.8 A cm$^{-2}$, was applied between the first cathode and the anode. After a period of 20 minutes the current diverter was operated such that the second cathode 1052 was connected to the negative pole of the power supply and served as the working electrode instead of the first cathode 1051. After a further 20 minutes the current diverter was operated again and the first cathode once again acted as the working electrode. This process was repeated at intervals of 20 minutes and for a total time of 180 minutes. Thereafter, the cell was cooled to room temperature, and the carbonaceous product exfoliated from the cathodes was retrieved from the solidified salt by washing with copious amounts of distilled water and vacuum filtering. The black carbonaceous powder obtained was dried at 100° C. The final product was analysed by various means and found to consist of 40 g of graphene nanosheets in the form of black fluffy powder. FIG. 8 shows SEM images of the graphene nanosheets. The micrographs indicate the preparation of high yield randomly oriented graphene nanosheets with an extremely high quality in appearance. FIG. 9 exhibits typical bright field TEM micrographs of the graphene nanosheets. A Selected area diffraction pattern recorded on the edge of a nanosheet is shown in the left top corner of FIG. 9 exhibiting the typical six-fold symmetry expected for graphene.

From the results obtained the production rate of graphene was calculated to be 1 kg/h·m² graphite electrode.

The invention claimed is:

1. A method of producing graphene sheets comprising the steps of,
   (a) forming a carbonaceous powder by electrochemical erosion of a graphite electrode in a molten salt comprising hydrogen ions,
   (b) recovering the resulting carbonaceous powder from the molten salt liquid, and
   (c) thermally treating the carbonaceous powder by heating the carbonaceous powder in a non-oxidising atmosphere to produce a thermally treated powder comprising graphene sheets.

2. A method according to claim 1 in which the molten salt comprises a halide salt of lithium, sodium or potassium.

3. A method according to claim 1 in which the temperature of the molten salt during the electrochemical erosion of the graphite electrode is greater than 800° C.

4. A method according to claim 1 in which the molten salt and the carbonaceous powder is recovered from the molten salt by a process comprising steps of cooling and solidifying the molten salt, and washing the solidified salt from the carbonaceous powder.

5. A method according to claim 4 further comprising the step of vacuum filtration of the washed carbonaceous material.

6. A method according to claim 1 in which the carbonaceous powder comprises a metal hydride compound prior to the step of thermal treatment, for example lithium hydride, the metal species in the metal hydride being derived from the molten salt.

7. A method according to claim 1 in which the carbonaceous powder is thermally treated by heating to a temperature of greater than 1,000° C., for example to 1250° C.+/−50° C., in a reducing atmosphere, for example, in a reducing gas atmosphere comprising a mixture of nitrogen and hydrogen.

8. A method according to claim 1 in which the carbonaceous powder is thermally treated by heating in a lower than atmospheric pressure environment.

9. A method according to claim 1 in which the graphene sheets are graphene nanosheets having lateral dimensions of greater than 200 nanometres.

10. A method according to claim 1 in which the current at the graphite electrode during electrochemical erosion of the electrode is greater than 0.5 A/cm².

11. A method according to claim 1 in which graphene sheets are produced at a rate of greater than 1 kg per hour, per square metre of graphite electrode immersed in the ionic liquid.

12. A method according to claim 1 in which the graphite electrode is cathodic in polarity during electrochemical erosion.

13. A method according to claim 1 comprising the step of:
   (a) forming a carbonaceous powder by electrochemical erosion of two or more graphite electrodes in a molten salt comprising hydrogen ions, each of the two or more graphite electrodes alternately serving as a negative electrode in connection with a positive counter electrode for periods of time in order to effect the electrochemical erosion.

14. A method of producing graphene sheets comprising the steps of:
   (a) forming a carbonaceous powder by electrochemical erosion of a graphite electrode in an ionic liquid, the ionic liquid comprising hydrogen ions,
   (b) recovering the resulting carbonaceous powder from the ionic liquid, and
   (c) thermally treating the carbonaceous powder by heating the carbonaceous powder in a non-oxidising or reducing atmosphere to produce a thermally treated powder comprising graphene sheets.

15. A method of producing graphene sheets comprising the steps of:
   (a) forming a carbonaceous powder by electrochemical intercalation of a metallic species and a hydrogen species into a graphite electrode, the graphite electrode being arranged in contact with an electrolyte, the electrolyte comprising the metallic species and the hydrogen species,
   (b) recovering the resulting carbonaceous powder from the electrolyte, and
   (c) thermally treating the carbonaceous powder by heating the carbonaceous powder in a non-oxidising or reducing atmosphere to produce a thermally treated powder comprising graphene sheets.

16. A method of producing graphene sheets comprising the steps of:
   (a) forming a carbonaceous powder by electrochemical erosion of a graphite electrode in a molten salt, in which electrochemical erosion of the graphite electrode is performed under an atmosphere comprising an inert gas and hydrogen, and
   (b) recovering the resulting carbonaceous powder, which comprises graphene sheets, from the molten salt.

17. A method according to claim 16 further comprising the step of:
   (c) thermally treating the carbonaceous powder by heating the carbonaceous powder in a non-oxidising atmosphere to produce a thermally treated powder comprising graphene sheets.

18. A method according to claim 16 in which the atmosphere comprises between 2 and 10 mole percent hydrogen and the inert gas is selected from the group consisting of argon and nitrogen.

19. A method according to claim 18, wherein the atmosphere is a dry atmosphere.

* * * * *